United States Patent
Unbehagen et al.

(10) Patent No.: US 9,001,829 B2
(45) Date of Patent: Apr. 7, 2015

(54) TECHNIQUES FOR ROUTING DATA BETWEEN NETWORK AREAS

(75) Inventors: Paul Unbehagen, Apex, NC (US); Roger Lapuh, Uesslingen (CH)

(73) Assignee: RPX Clearinghouse LLC, San Francisco, CA (US)

( * ) Notice: Subject to any disclaimer, the term of this patent is extended or adjusted under 35 U.S.C. 154(b) by 0 days.

(21) Appl. No.: 13/451,776

(22) Filed: Apr. 20, 2012

(65) Prior Publication Data

US 2012/0233350 A1    Sep. 13, 2012

Related U.S. Application Data

(63) Continuation of application No. 12/483,690, filed on Jun. 12, 2009, now abandoned.

(51) Int. Cl.
| | |
|---|---|
| *H04L 12/28* | (2006.01) |
| *H04L 12/46* | (2006.01) |
| *H04L 12/715* | (2013.01) |
| *H04L 12/721* | (2013.01) |

(52) U.S. Cl.
CPC ........ *H04L 12/4625* (2013.01); *H04L 12/4633* (2013.01); *H04L 45/04* (2013.01); *H04L 45/66* (2013.01)

(58) Field of Classification Search
None
See application file for complete search history.

(56) References Cited

U.S. PATENT DOCUMENTS

| | | | |
|---|---|---|---|
| 5,825,772 A * | 10/1998 | Dobbins et al. ............... 370/396 |
| 5,917,820 A | 6/1999 | Rekhter | |
| 6,788,681 B1 | 9/2004 | Hurren et al. | |
| 6,914,905 B1 * | 7/2005 | Yip et al. ................ 370/395.53 |
| 6,963,575 B1 | 11/2005 | Sistanizadeh et al. | |
| 7,453,888 B2 | 11/2008 | Zabihi et al. | |
| 7,881,314 B2 * | 2/2011 | Regale et al. ................ 370/401 |
| 8,144,715 B2 * | 3/2012 | Ould Brahim et al. ....... 370/401 |
| 2002/0067731 A1 | 6/2002 | Houston et al. | |
| 2004/0042454 A1 | 3/2004 | Zabihi et al. | |
| 2007/0058638 A1 | 3/2007 | Guichard et al. | |
| 2007/0076719 A1 | 4/2007 | Allan et al. | |
| 2008/0049753 A1 | 2/2008 | Heinze et al. | |

(Continued)

FOREIGN PATENT DOCUMENTS

| | | |
|---|---|---|
| CN | 1848766 A1 | 10/2006 |
| CN | 101107824 A1 | 1/2008 |
| CN | 101237407 A1 | 8/2008 |

OTHER PUBLICATIONS

International Search Report and Written Opinion for International Patent Application No. PCT/US10/37733 mailed Aug. 6, 2010.

(Continued)

*Primary Examiner* — Minh-Trang Nguyen
(74) *Attorney, Agent, or Firm* — Christopher & Weisberg, P.A.

(57) ABSTRACT

Techniques for routing data between network area are disclosed. In one particular exemplary embodiment, the techniques may be realized as a method for routing data between layer 2 network areas of backbone bridges comprising the steps of receiving data at a network element containing an internally terminated Network to Network Interface (NNI) for a plurality of network areas, identifying a destination address associated with the data, determining a network area of the plurality of network areas associated with the data, and performing one or more data flow treatments associated with the data using the internally terminated Network to Network Interface (NNI).

12 Claims, 3 Drawing Sheets

(56) References Cited

U.S. PATENT DOCUMENTS

| | | |
|---|---|---|
| 2008/0170573 A1 | 7/2008 | Ould-brahim |
| 2008/0247406 A1* | 10/2008 | Figueira et al. ............... 370/401 |
| 2010/0281106 A1* | 11/2010 | Ashwood-Smith ........... 709/203 |
| 2011/0022725 A1* | 1/2011 | Farkas .......................... 709/238 |

OTHER PUBLICATIONS

Viswanathan, A. et al., 'Evolution of Multiprotocol Label Switching.' In: Communications Magazine, IEEE, vol. 36, Issue 5, May 1998; pp. 165-173, Digital Object Identifier 10.1109/35.668287.

1st Japanese Office Action and Search Report in Japanese and its English translation dated Jan. 28, 2014 for corresponding Japanese National Stage Application Serial No. 2012-515053, Japanese National Stage Entry Date: Dec. 9, 2011, consisting of 6 pages.

Kunio Hato, Global Area Virtual Ethernet Services GAVES IEEE802.1ah Provider Backbone Briges, an Overview, NTT Technical Review, Japan, The Telecommunications Association, Apr. 1, 2006, vol. 18, Issue 4, pp. 12-16 consisting of 6-pages.

Hideaki Kasahara, New communication provided by NGN and a technique for supporting it, A Network Basic Technology for Supporting an NGN network, NTT Technical Review, Japan, The Telecommunications Association, Apr. 1, 2007, vol. 19, Issue 4, pp. 38-43.

English Translation of Chinese Office Action and Chinese Search Report and Chinese Language Chinese Office Action and Chinese Search Report dated Feb. 8, 2014 for Chinese Serial No. 201080025792.8, dated Dec. 12, 2011 consisting of 17-pages.

English Translation of Russian Office Action and Russian Search Report and Russian Language Russian Office Action and Russian Search Report dated May 12, 2014 for Russian Serial No. 2011153500, filed Jan. 12, 2012 consisting of 6-pages.

English Translation of 2nd Chinese Office Action and Chinese Language copy of 2nd Chinese Office Action dated Sep. 30, 2014 for Chinese Serial No. 201080025792.8, dated Dec. 12, 2011 consisting of 8-pages.

* cited by examiner

United States Patent US 9,001,829 B2

TECHNIQUES FOR ROUTING DATA BETWEEN NETWORK AREAS

CROSS-REFERENCE TO RELATED APPLICATIONS

This patent application is a Continuation of U.S. patent application Ser. No. 12/483,690 filed Jun. 12, 2009, which is hereby incorporated by reference herein in its entirety.

This patent application is related to U.S. patent application Ser. No. 11/899,118, filed Sep. 4, 2007, which is hereby incorporated by reference herein in its entirety.

FIELD OF THE DISCLOSURE

The present disclosure relates generally to network communications and, more particularly, to techniques for routing data between network areas.

BACKGROUND OF THE DISCLOSURE

Networks may be logically subdivided into Virtual Private Networks (VPNs), Virtual Local Area Networks (VLANs), or another logical subnets, network areas, or domains. For example, a VLAN may be further logically subdivided by a user into a plurality of user VLANs or VPNs. Provider Backbone Bridging (PBB) and/or Provider Link State Bridging (PLSB) may be used to separate an enterprise domain from one or more user domains by using an additional MAC (Media Access Control) address header in an Ethernet Frame. PLSB may enable the use of a link state protocol to improve the sharing of layer 2 information. However, layer 2 VPNs may terminate on a User Network Interface (UNI) port. Routing among these user VPNs may require actual port to port connections. Establishing such port to port connections may require connecting UNI ports of a VPN to an external router. Such routing may be difficult to increase in scale and manage as the number of user VPNs increases.

In another approach to provide routing connectivity between user VPNs, an external routing function may process translation between a layer 2 VPN and a PLSB layer 2 VPN. This approach may also require an additional connection to an external router to handle translation between a layer 2 VPN and a PLSB layer 2 VPN for multiple layer 2 ELSE VPNs terminating on a VLAN UNI port. Thus, this approach may also require external routing and may add additional overhead and complexity.

In view of the foregoing, it may be understood that there may be significant problems and shortcomings associated with current technologies for routing data between network areas.

SUMMARY OF THE DISCLOSURE

Techniques for routing data between network area are disclosed. In one particular exemplary embodiment, the techniques may be realized as a method for routing data between layer 2 network areas of backbone bridges comprising the steps of receiving data at a network element containing an internally terminated Network to Network Interface (NNI) for a plurality of network areas, identifying a destination address associated with the data, determining a network area of the plurality of network areas associated with the data, and performing one or more data flow treatments associated with the data using the internally terminated Network to Network Interface (NNI).

In accordance with other aspects of this particular exemplary embodiment, performing one or more data flow treatments associated with the data may comprise routing the data to the determined network area.

In accordance with further aspects of this particular exemplary embodiment, performing one or more data flow treatments associated with the data may comprise at least one of: network traffic policing; firewall functionality; network traffic metering; and network intrusion detection.

In accordance with additional aspects of this particular exemplary embodiment, the network areas may comprise Virtual Private Networks (VPNs).

In accordance with further aspects of this particular exemplary embodiment, the network areas may comprise Virtual Local Area Networks (VLANs).

In accordance with further aspects of this particular exemplary embodiment, the Virtual Local Area Networks may be associated with a Service Instance VLAN ID (I-SID).

In accordance with further aspects of this particular exemplary embodiment, the network element may be associated with a plurality of Service Instance VLAN IDs and performing one or more data flow treatments utilizes at least one of the plurality of Service Instance VLAN IDs.

In accordance with further aspects of this particular exemplary embodiment, the destination address may comprise a backbone Media Access Control (B-MAC) address.

In accordance with further aspects of this particular exemplary embodiment, determining the network area associated with the data may comprise using a Service Instance VLAN ID (I-SID) associated with the data to determine the network area.

In accordance with further aspects of this particular exemplary embodiment, the techniques may be realized as at least one processor readable storage medium for storing a computer program of instructions configured to be readable by at least one processor for instructing the at least one processor to execute a computer process for performing the method.

In another particular exemplary embodiment, the techniques may be realized as an article of manufacture for routing data between layer 2 network areas of backbone bridges, the article of manufacture comprising at least one processor readable storage medium, and instructions stored on the at least one storage medium, wherein the instructions are configured to be readable from the at least one storage medium by at least one processor and thereby cause the at least one processor to operate so as to receive data at a network element containing an internally terminated Network to Network Interface (NNI) for a plurality of network areas, identify a destination address associated with the data, determine a network area of the plurality of network areas associated with the data, and perform one or more data flow treatments associated with the data using the internally terminated Network to Network Interface (NNI).

In yet another particular exemplary embodiment, the techniques may be realized as a system for routing data between network areas comprising one or more processors communicatively coupled to a network element, wherein the network element is configured to receive data at a network element containing an internally terminated Network to Network Interface (NNI) for a plurality of network areas, identify a destination address associated with the data, determine a network area of the plurality of network areas associated with the data, and perform one or more data flow treatments associated with the data using the internally terminated Network to Network Interface (NNI).

In accordance with further aspects of this particular exemplary embodiment, performing one or more data flow treatments associated with the data may comprise routing the data to the determined network area.

In accordance with further aspects of this particular exemplary embodiment, performing one or more data flow treatments associated with the data may comprise at least one of: network traffic policing, firewall functionality, network traffic metering, and network intrusion detection.

In accordance with further aspects of this particular exemplary embodiment, the network areas may comprise Virtual Private Networks (VPNs).

In accordance with further aspects of this particular exemplary embodiment, the network areas may comprise Virtual Local Area Networks (VLANs).

In accordance with further aspects of this particular exemplary embodiment, the Virtual Local Area Networks may be associated with a Service Instance VLAN ID (I-SID), In accordance with further aspects of this particular exemplary embodiment, the network element may be associated with a plurality of Service Instance VLAN IDs and performing one or more data flow treatments utilizes at least one of the plurality of Service Instance VLAN IDs.

In accordance with further aspects of this particular exemplary embodiment, the destination address may comprise a backbone Media Access Control (B-MAC) address.

In accordance with further aspects of this particular exemplary embodiment, determining the network area associated with the data may comprise the network element using a Service Instance VLAN ID (I-SID) associated with the data to determine the network area.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
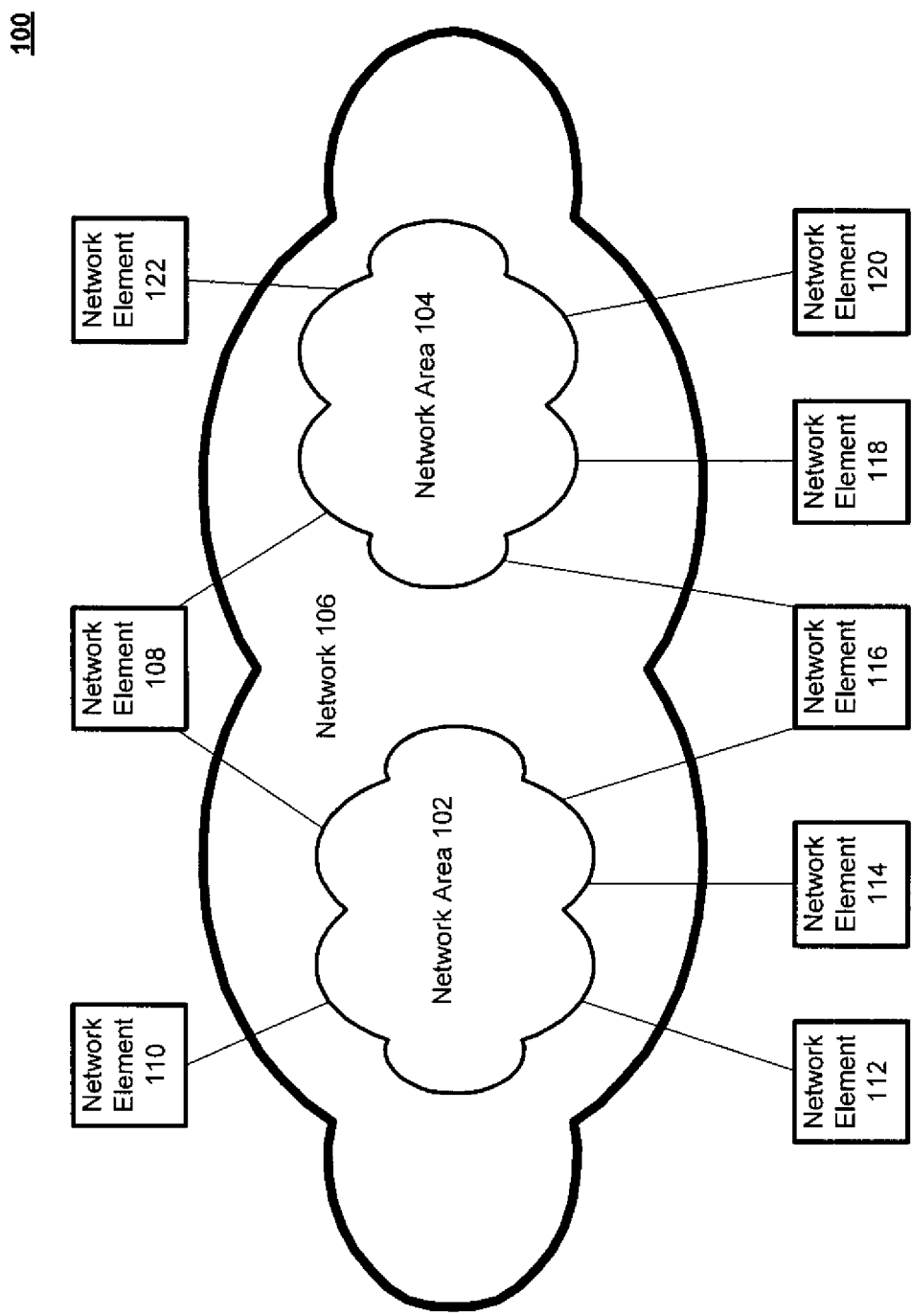
FIG. 1 shows a system for routing data between network areas in accordance with an embodiment of the present disclosure.

Referring to FIG. 1, there is shown a system 100 for routing data between network areas in accordance with an embodiment of the present disclosure. FIG. 1 is a simplified view of system 100, which may include additional elements that are not depicted. In system 100, network elements 108, 110, 112, 114, 116, 118, 120, and 122 may be communicatively coupled as part of network 106. Network 106 may be logically subdivided. For example, network 106 may be an IPv4 based network which may be subnetted into one or more areas or domains, such as network areas 102 and 104. Each of the network elements 108, 110, 112, 114, 116, 118, 120, and 122 may be communicatively coupled to one or more of the network areas 102 and 104. One or more of the network elements 108, 110, 112, 114, 116, 118, 120, and 122 may also be communicatively coupled to additional network areas (not shown). As illustrated, network elements 110, 112, and 114 may be communicatively coupled to network area 102. Network elements 118, 120, and 122 may be communicatively coupled to network area 104. Network elements 108 and 116 may be communicatively coupled to both network areas 102 and 104.

Network 106 may be a Virtual Local Area Network (VLAN), Backbone VLAN (BVLAN), or another logical network structure that permits communication between network elements 108, 110, 112, 114, 116, 118, 120, and 122, and other devices communicatively coupled to network 106. According to one or more embodiments, network 106 may be a network service provider VLAN implemented using Provider Link State Bridging (PLSB) or IEEE 802.1aq. Network 106 may be implemented logically on top of IEEE 802.1ah or Provider Backbone Bridges (PBB). The Provider Backbone Bridges may implement MAC-in-MAC or use an additional Media Access Control (MAC) address in an Ethernet frame for provider core backbone routing (e.g., a Backbone MAC address or B-MAC address may be used to encapsulate a customer MAC Ethernet Frame). An additional Ethernet header may contain source and destination backbone addresses, a virtual LAN identifier (B-VLAN), and a 24 bit service instance VLAN ID (I-SID). Network 106 may implement a link state routing protocol, such as, for example, the standard Intermediate System to Intermediate System (IS-IS) routing protocol, to learn and distribute network information, such as B-MAC addresses and I-SID values.

Network Areas 102 and 104 may be logical subdivisions of network 106, such as VLANs or VPNs. Network areas may be associated with a 24 bit service instance VLAN ID (I-SID). In one or more embodiments, network areas 102 and 104 may be customer VLANs. Although two network areas are shown, it may be appreciated that a user may implement many more network areas, such as additional VLANs.

Network elements 108, 110, 112, 114, 116, 118, 120, and 122 may be routers, switches, or other devices communicatively coupled to network 106. Network elements 108, 110, 112, 114, 116, 118, 120, and 122 may be connected with networked resources such as servers, databases, and/or networked storage. Network elements 108, 110, 112, 114, 116, 118, 120, and 122 may be network edge equipment, such as provider edge equipment, which may provide connectivity to one or more end users.

As mentioned above, in one or more embodiments, some of the network elements 108, 110, 112, 114, 116, 118, 120, and 122 may be associated with a plurality of network areas, such as network areas 102 and 104. For example, network element 116 and/or network element 108 may be associated with network area 102 and network area 104. These network areas may be associated with a specific 24 bit service instance VLAN ID (I-SID). For example, network area 102 may be associated with I-SID 102 and network area 104 may be associated with I-SID 104. For example, in response to a request from a user connected via network element 120, a server associated with network element 110 may return a reply. A network element, such as network element 108, may receive data sent from network element 110.

According to one or more embodiments, routing may be performed by a routing function executed on a PLSB NNI (Network to Network Interface) interface. The NNI may be an interface between network area 102 and network area 104 and may be implemented on network element 108. The routing function may identify a 24 bit service instance VLAN ID (I-SID) in an Ethernet Frame and may identify network area 104 as being associated with the I-SID. Thus, network element 108 may route the portion of data it receives from network element 110 to network element 120 via network area 104.

Network element 108 may perform alternative and/or additional functions such as data flow treatments, such as one or more data flow treatments performed at layers 4 through 7 of the standard OSI (Open Systems Interconnection) model. For example, network element 108 may perform network traffic policing, firewall functionality, network traffic metering, and network intrusion detection. The routing functionality may support upper level protocols, including, but not limited to: ARP (Address Resolution Protocol), RIP (Routing Information Protocol), OSPF (Open Shortest Path First), and BGP (Border Gateway Protocol).

Figure 2:
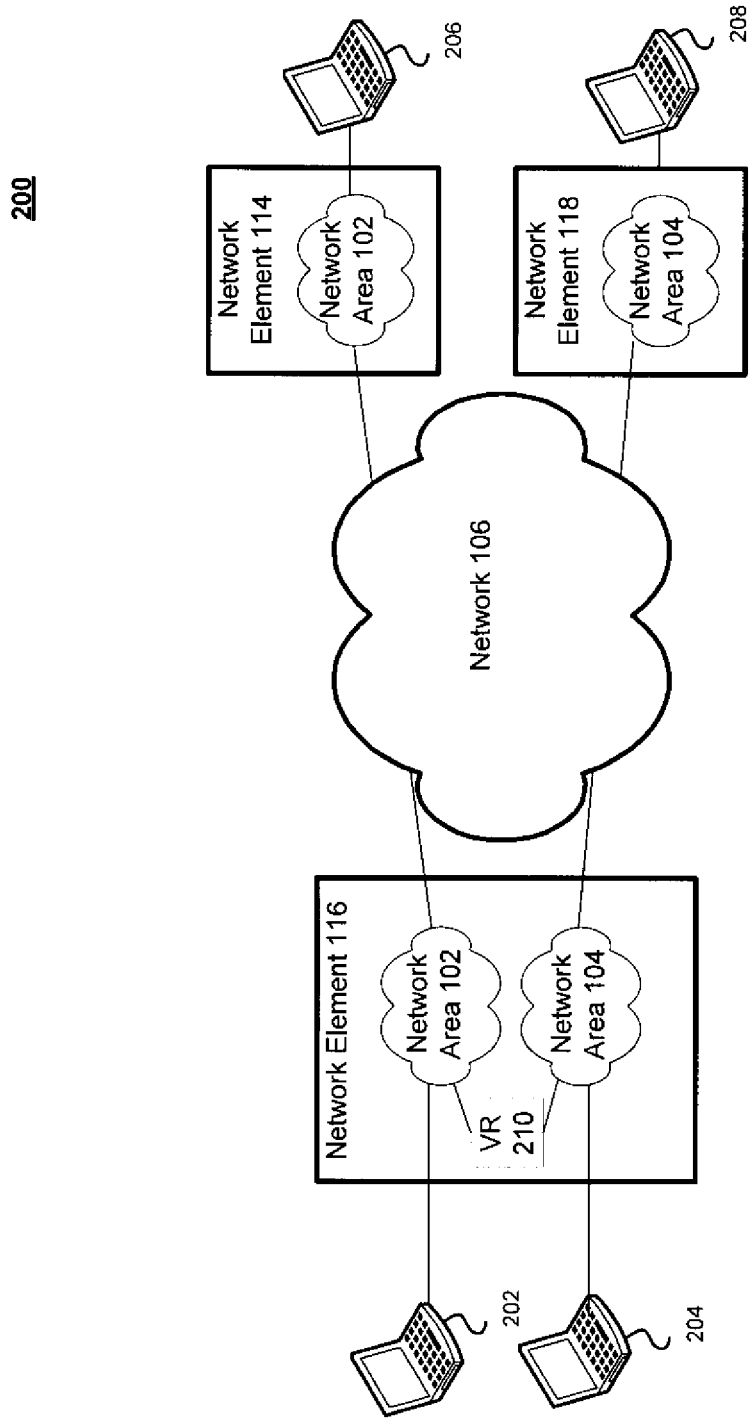
FIG. 2 shows a system for routing data between network areas in accordance with an embodiment of the present disclosure.

Referring to FIG. 2, there is shown a system 200 for routing data between network areas in accordance with an embodiment of the present disclosure. FIG. 2 is a simplified view of system 200, which may include additional elements that are not depicted. In system 200, elements of system 100 are incorporated and contain identical numbering.

Computers 202, 204, 206, and/or 208 may be desktop computers, laptop computers, servers, databases, hosts, or other computers communicatively coupled with network elements associated with network 106. As shown, computers 202 and 206 may be associated with network area 102, which may be identified by I-SID 102, Computers 204 and 208 may be associated with network area 104 which may be identified by I-SID 104. Data received at a network element may be examined to determine whether the data, such as an incoming Ethernet frame, needs to be bridged or routed.

According to some embodiments, routing may be performed by a routing function executed on an internally terminated PLSB Network to Network Interface (NNI) between two network areas. For example, network element 116 may contain a virtual routing instance 210 which utilizes an NNI between two network areas. The NNI between network area 102 and network area 104 may be associated with network element 116 and may support a routing instance that may perform one or more data flow treatments. For example, data received by network element 116 from computer 202 may be examined to determine a destination MAC address. If the destination MAC address is associated with computer 206, then network element 116 may determine that computer 206 is associated with the same network area (i.e., network area 102 which is identified by I-SID 102). Network element 116 may then bridge the data to network element 114. Network element 116 may be capable of bridging or routing data whether it is received from a network area of network 106 or from a device communicatively coupled to a User Network Interface (UNI) port (e.g., network element 116 may handle data that contains a single MAC address header per frame or data that is MACinMac encapsulated.)

If the destination MAC address is associated with an NNI of network element 116, network element 116 may determine the traffic is to be routed to network area 104 which is identified by I-SID 104. Network element 116 may then utilize a virtual routing instance 210 on the NNI between the two network areas to perform one or more data flow treatments, such as data flow treatments performed at layers 4 through 7 of the standard OSI (Open Systems Interconnection) model. For example, network element 116 may route the data to network area 104. Network element 116 may also perform other actions such as, for example, network traffic policing, firewall functionality, network traffic metering, and network intrusion detection. The routing functionality may support upper level protocols, including, but not limited to: ARP (Address Resolution Protocol), RIP (Routing Information Protocol), OSPF (Open Shortest Path First), and BGP (Border Gateway Protocol).

Figure 3:
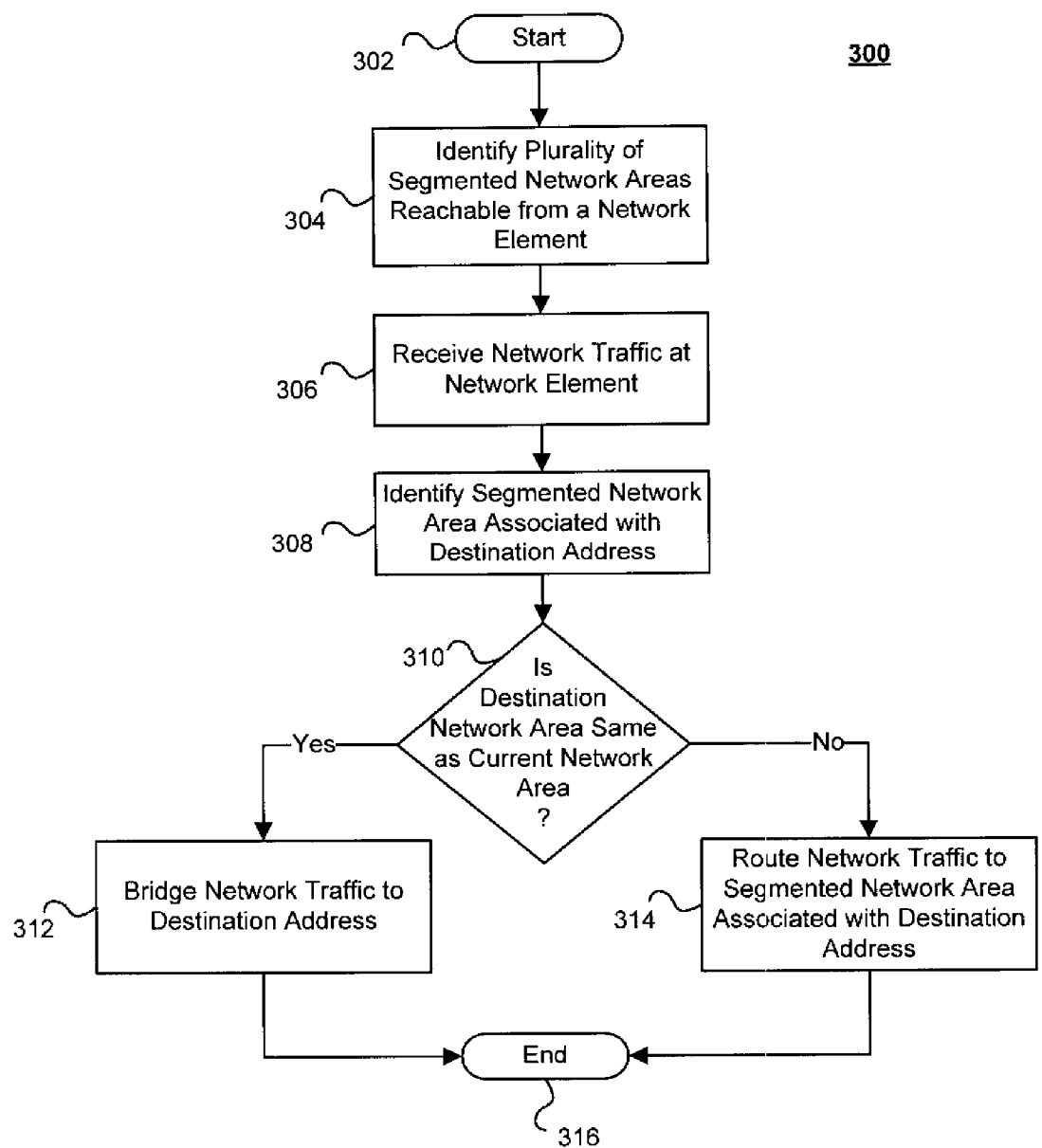
FIG. 3 depicts a method for routing data between network areas in accordance with an embodiment of the present disclosure.

Referring to FIG. 3, there is shown a method 300 for routing data between network areas in accordance with an embodiment of the present disclosure. At block 302, the method may begin.

At block 304, the method 300 may include identifying a plurality of segmented network areas reachable from a network node. For example, a plurality of VPNs or VLANs may be identified. According to one or more embodiments, network elements, such as routers on a network implementing method 300 may utilize Provider Link State Bridging (PLSB) or IEEE 802.1aq. The method 300 may implement a link state routing protocol, such as Intermediate System to Intermediate System (IS-IS) routing protocol, to learn and distribute network information, such as B-MAC addresses and I-SID values. Network elements, such as routers and switches, may use network information received from the IS-IS routing protocol to identify a plurality of network areas, such as VLANs associated with I-SID values.

At block 306, the method 300 may include receiving network traffic at a network element. For example, network element 116 may receive data from computer 206 associated with a network area, such as a VLAN or more particularly a Customer VLAN.

At block 308, the method 300 may include identifying a segmented network area associated with a Customer MAC (CMAC) address of the received network traffic. The customer MAC address may be associated with a network area such as a VLAN.

At block 310, the method 300 may determine whether the destination network area is the same as the current network area. For example, if the CMAC is the MAC address of the current node (e.g., network element 116), then an internal logical routing interface using an internally terminated NNI, such as virtual routing instance 210, may determine if the CMAC of the network traffic is destined to the router NNI. If so the network traffic may be routed at block 314. If the CMAC of the network traffic is not a MAC address associated with the NNI, the network traffic may be bridged at block 312. Other data flow treatments may be performed in place of routing or in addition to routing. For example, the routing of traffic may be denied by a firewall. The routing functionality may support upper level protocols, including, but not limited to: ARP (Address Resolution Protocol), RIP (Routing Information Protocol), OSPF (Open Shortest Path First), and BGP (Border Gateway Protocol). According to one or more embodiments, routing and/or other data flow treatments may be performed on a PLSB NNI interface between two network areas, such as VLANs.

At block 312, the method may end.

At this point it should be noted that routing between logical network subnets in accordance with the present disclosure as described above typically involves the processing of input data and the generation of output data to some extent. This input data processing and output data generation may be implemented in hardware or software. For example, specific electronic components may be employed in a router or similar or related circuitry for implementing the functions associated with data flow control between network areas in accordance with the present disclosure as described above. Alternatively, one or more processors operating in accordance with instructions may implement the functions associated with data flow control between network areas in accordance with the present disclosure as described above. If such is the case, it is within the scope of the present disclosure that such instructions may be stored on one or more processor readable media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method of forwarding an internet protocol (IP) packet at a network element comprising, a virtual routing instance communicatively coupling at least two layer 2 network areas, each layer 2 network area being associated with a respective I-SID value, the method comprising:
    receiving, from a source layer 2 network area, an Ethernet frame having an IP packet encapsulated therein, the Ethernet frame comprising a service instance identifier (I-SID) value and at least one destination media access control (MAC) address; and
    when a destination MAC address of the received Ethernet frame is associated with the virtual routing instance, applying a routing data flow treatment, the routing data flow treatment comprising:
    identifying a layer 2 network area associated with an IP destination address of the IP packet; and
    forwarding the IP packet to the identified layer 2 network area in an Ethernet frame having an I-SID value associated with the identified layer 2 network area.

2. The method of claim 1, wherein applying a routing data flow treatment further comprises performing data flow treatment in at least one of layers 4 through 7 of the open systems interconnection (OSI) model.

3. The method of claim 2, wherein performing data flow treatment in at least one of layers 4 through 7 comprises at least one of, firewall processing, network traffic metering and network intrusion detection.

4. The method of claim 1, wherein the routing data flow treatment employs at least one of address resolution protocol (ARP), routing information protocol (RIP), open shortest path first (OSPF) protocol and border gateway protocol (BGP).

5. The method of claim 1, comprising, when a destination MAC address of the Ethernet frame is associated with a node of the source layer 2 network area, bridging the IP packet to the destination MAC address on the source layer 2 network area.

6. A network element for forwarding an IP packet over IEEE 802.1aq Provider Ethernet network areas to destination addresses, the network element comprising:
    a virtual routing instance communicatively coupling at least two layer 2 network areas, each layer 2 network area being associated with a respective I-SID value, and the network element being configured to receive, from a source layer 2 network area, an Ethernet frame having an IP packet encapsulated therein, the IP packet comprising an IP destination address, the Ethernet frame comprising a service instance identifier (I-SID) value and at least one destination media access control (MAC) address associated with the virtual routing instance; and
    when a destination MAC address of the received Ethernet frame is associated with the virtual routing instance:
    performing at least one routing data flow treatment on the encapsulated IP packet, the at least one routing data flow treatment comprising identifying a layer 2 network area associated with the IP destination address of the IP packet and forwarding the IP packet to the identified layer 2 network area in an Ethernet frame having an I-SID value associated with the identified layer 2 network area.

7. The network element of claim 6, configured to apply at least one layer 4 to layer 7 data flow treatment to the encapsulated IP packet the at least one layer 4 to layer 7 data flow treatment comprising at least one of firewall processing, network traffic metering and network intrusion detection.

8. The network element of 6, wherein identifying a layer 2 network associated with the IP destination address comprises acquiring information at least in part through at least one routing protocol.

9. The network element of claim 8, wherein the at least one routing protocol comprises at least one of ARP (Address Resolution Protocol), RIP (Routing Information Protocol), OSPF (Open Shortest Path First), and BGP (Border Gateway Protocol).

10. The network element of claim 6, further comprising:
    a receive processing function configured to determine a destination layer 2 network area by:
    examining an Ethernet frame header encapsulating the received IP frame; and
    matching a value of an I-SID field in the header with an I-SID values associated with the destination layer 2 network area.

11. The network element of claim 6, further comprising:
    a User Network Interface UNI port for receiving IP frames originating from computer devices, each IP frame comprising a single MAC address header per frame; and
    a receive processing function configured to determine a destination network area of a received IP frame from fields that comprise the single MAC header.

12. The network element of claim 6, wherein the network element is a router.

* * * * *